Aug. 16, 1966 R. E. BONNER 3,267,432

MULTI-LEVEL TEST CHANNEL FOR SPECIMEN IDENTIFICATION

Filed Nov. 1, 1963 6 Sheets-Sheet 1

INVENTOR
RAYMOND E. BONNER
BY John J. Goodwin
ATTORNEY

Aug. 16, 1966 R. E. BONNER 3,267,432

MULTI-LEVEL TEST CHANNEL FOR SPECIMEN IDENTIFICATION

Filed Nov. 1, 1963 6 Sheets-Sheet 2

MULTI-LEVEL TEST CHANNEL FOR SPECIMEN IDENTIFICATION

Filed Nov. 1, 1963 6 Sheets-Sheet 3

Aug. 16, 1966 R. E. BONNER 3,267,432

MULTI-LEVEL TEST CHANNEL FOR SPECIMEN IDENTIFICATION

Filed Nov. 1, 1963 6 Sheets-Sheet 4

MULTI-LEVEL TEST CHANNEL FOR SPECIMEN IDENTIFICATION

Filed Nov. 1, 1963

United States Patent Office 3,267,432

Patented August 16, 1966

3,267,432
MULTI-LEVEL TEST CHANNEL FOR SPECIMEN IDENTIFICATION

Raymond E. Bonner, Yorktown Heights, N.Y., assignor to International Business Machines Corporation, New York, N.Y., a corporation of New York Filed Nov. 1, 1963, Ser. No. 320,788
13 Claims. (Cl. 340—146.3)

The present invention relates to specimen recognition and identification systems and more particularly to a multi-level system for recognizing and identifying sample specimens as members of particular specimen sets.

There are many practical situations wherein it is desirable to identify an unknown input specimen as being a member of a particular class, for example in the pattern recognition and speech recognition technologies. In systems designed for specimen recognition, it is usual that the characteristics of the unknown specimen are determined, and a decision is then made as to the class of which the specimen is a member. There are various known methods of accomplishing such decision, one example being correlation, with the particular method employed by any one system being determined by the environment in which the system is to be employed.

It is possible that recognition systems may fail to properly identify an unknown specimen, with a common form of error being termed "substitution errors." A substitution error occurs when the system incorrectly identifies the input specimen of a given class as a member of a different class. A substitution error is generally accepted as valid since there is no way of determining that it is an error. It is therefore very desirable that a specimen identification system be provided wherein substitution errors do not occur.

In the present invention, an embodiment of which will be described hereinbelow, a specimen recognition system is provided wherein such substitution errors will not occur when the system is operating with the specimen sets for which it is designed. The specimen recognition system of the present invention includes means for performing a form of test herein referred to as an inclusive test. The inclusive test is particularly adaptable to the problems of specimen recognition in that it is simply constructed, and an inclusive test may be employed for practically all forms of specimen recognition environments, which is not generally true of other recognition schemes such as correlation. As further advantages, inclusive tests may be automatically constructed, that is, they may be self-adaptive, and systems including inclusive test means may be designed such that tests for new classes of specimens may be added thereto without the necessity of reconstructing the tests in the original portion of the system.

An object of the present invention is to provide a specimen recognition system for determining the identities of unknown input specimens.

Another object of the present invention is to provide a specimen recognition system including inclusive test means.

Still another object of the present invention is to provide a specimen recognition system wherein substitution errors will not occur with the specimen sets designed therefor.

A further object of the present invention is to provide a specimen recognition system wherein tests for additional specimen classes may be added to the existing test means without modification.

The foregoing and other objects, features and advantages of the invention will be apparent from the following more particular description of a preferred embodiment of the invention, as illustrated in the accompanying drawings.

Figure 1:
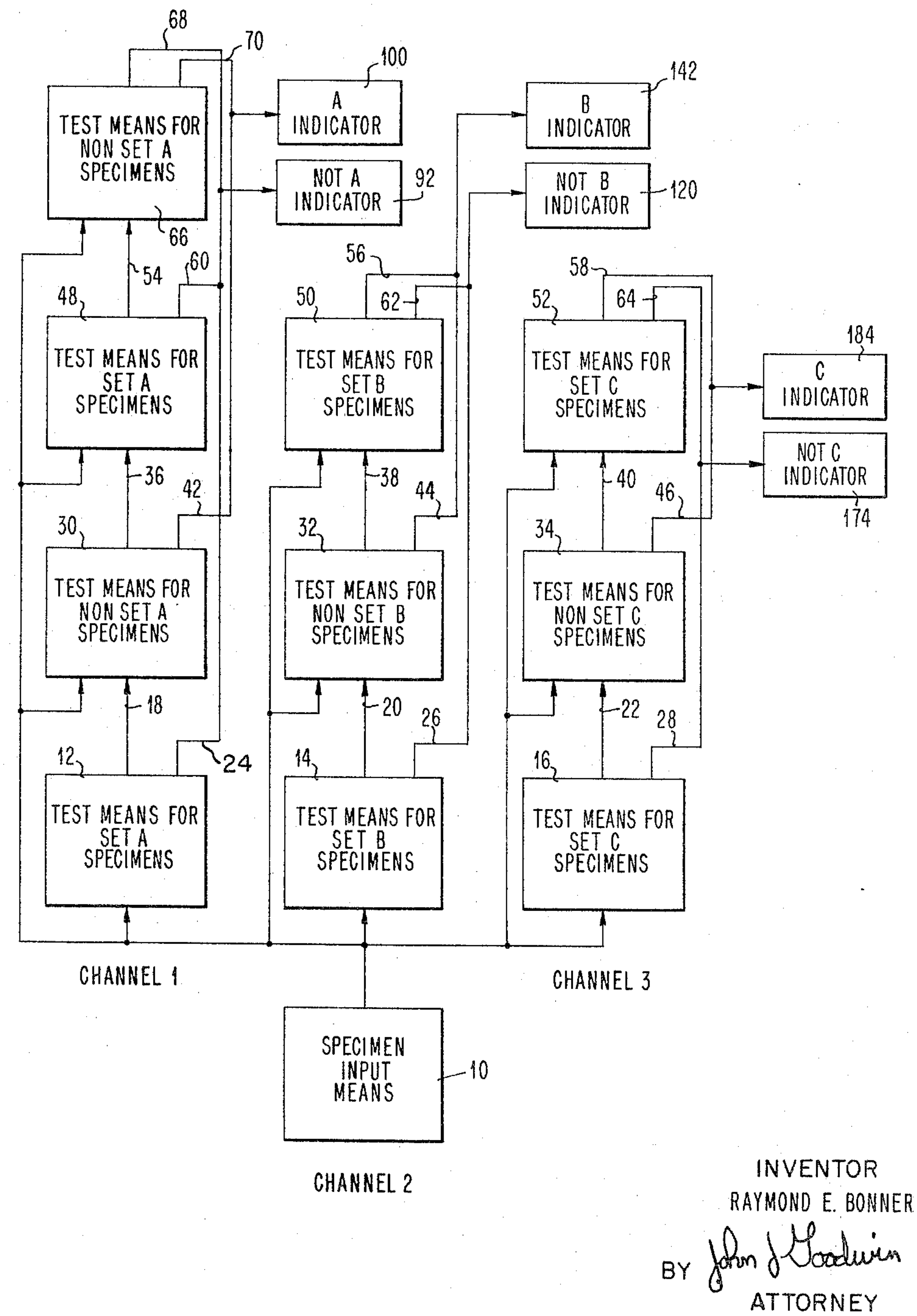
FIG. 1 is a block diagram of an embodiment of a specimen recognition system following the principles of the present invention.

Before discussing the illustrated embodiment, an example of representative specimen sets will be presented with which the embodiment will be related. The invention described herein is universal to specimen sets in general, in any environment, and is not limited to speech specimens, pattern specimens, etc. In order to give a clear understanding of the principles of the invention, specific sets of specimens will be defined, and an embodiment in accordance with the principles of the present invention will be set forth to handle the specimens of the specific sets.

Consider a plurality of specimen sets, each set including a plurality of specimens which constitute the set. The sets and the specimens therein may relate to any of a large number of indicia. For example, in character recognition each set may be a separate alphabetical character and the specimens in each set may be the total number of ways such character may be depicted, i.e., block form, handwritten, gothic, etc. In speech recognition, each set may be a separate vocal sound, and the specimens within each set may be the different ways such vocal sound is spoken by a number of different speakers. The present invention describes a specimen recognition system which, when presented with a sample specimen which may be a member of one of a plurality of different sets, will identify the set of which the sample specimen is a member.

The present invention will be described with relation to sets composed of specimens wherein the specimens are set forth as ten digit binary numbers. The invention is not necessarily restricted to specimens in the form of binary signals, however since many a wide variety of different type specimens may be represented by a binary value, the present explanation using binary specimens will be useful.

Consider three sets of specimens, referred to as set A, set B, and set C. Each set contains nine specimens characterized as ten bit binary numbers. Sets A, B, and C appear as follows in Table I.

TABLE I

| | SET A | | | | | | | | | |
|---|---|---|---|---|---|---|---|---|---|---|
| | 1 | 2 | 3 | 4 | 5 | 6 | 7 | 8 | 9 | 10 |
| A1 | 0 | 0 | 1 | 1 | 0 | 1 | 0 | 1 | 0 | 1 |
| A2 | 0 | 1 | 1 | 1 | 0 | 1 | 1 | 0 | 1 | 1 |
| A3 | 1 | 0 | 1 | 1 | 0 | 1 | 0 | 0 | 1 | 1 |
| A4 | 0 | 1 | 1 | 1 | 1 | 0 | 0 | 1 | 0 | 0 |
| A5 | 0 | 0 | 1 | 1 | 0 | 0 | 0 | 0 | 0 | 0 |
| A6 | 0 | 1 | 1 | 0 | 0 | 0 | 0 | 0 | 0 | 1 |
| A7 | 0 | 0 | 1 | 1 | 0 | 1 | 0 | 1 | 1 | 1 |
| A8 | 0 | 0 | 1 | 1 | 0 | 1 | 1 | 1 | 1 | 0 |
| A9 | 1 | 0 | 1 | 0 | 0 | 1 | 1 | 1 | 0 | 1 |
| | SET B | | | | | | | | | |
| | 1 | 2 | 3 | 4 | 5 | 6 | 7 | 8 | 9 | 10 |
| B1 | 1 | 1 | 1 | 1 | 0 | 0 | 0 | 0 | 0 | 0 |
| B2 | 1 | 1 | 1 | 1 | 1 | 1 | 1 | 0 | 0 | 0 |
| B3 | 0 | 0 | 0 | 0 | 0 | 0 | 1 | 0 | 0 | 1 |
| B4 | 1 | 1 | 1 | 0 | 1 | 0 | 1 | 0 | 1 | 1 |
| B5 | 0 | 1 | 0 | 0 | 1 | 0 | 0 | 0 | 1 | 1 |
| B6 | 1 | 1 | 0 | 1 | 1 | 0 | 1 | 0 | 0 | 0 |
| B7 | 1 | 1 | 1 | 0 | 1 | 0 | 0 | 0 | 0 | 0 |
| B8 | 1 | 1 | 0 | 1 | 0 | 1 | 1 | 0 | 1 | 0 |
| B9 | 1 | 0 | 0 | 0 | 0 | 0 | 0 | 0 | 0 | 1 |
| | SET C | | | | | | | | | |
| | 1 | 2 | 3 | 4 | 5 | 6 | 7 | 8 | 9 | 10 |
| C1 | 0 | 0 | 0 | 1 | 1 | 1 | 1 | 0 | 0 | 1 |
| C2 | 0 | 0 | 0 | 1 | 1 | 1 | 1 | 0 | 1 | 1 |
| C3 | 0 | 1 | 1 | 1 | 1 | 0 | 0 | 1 | 1 | 1 |
| C4 | 1 | 0 | 0 | 1 | 1 | 0 | 1 | 1 | 1 | 1 |
| C5 | 0 | 0 | 0 | 1 | 1 | 1 | 1 | 1 | 1 | 1 |
| C6 | 0 | 1 | 0 | 0 | 0 | 1 | 1 | 1 | 1 | 0 |
| C7 | 0 | 1 | 0 | 0 | 0 | 1 | 0 | 0 | 0 | 1 |
| C8 | 0 | 0 | 0 | 1 | 1 | 1 | 0 | 1 | 1 | 0 |
| C9 | 1 | 0 | 0 | 0 | 1 | 0 | 1 | 1 | 1 | 1 |

Sets A, B, and C set forth, for purposes of illustration, twenty-seven distinct ten-bit binary words. The ten-bit binary words are grouped into the sets of which they are members, the sets being referred to as set A, set B, and set C. As previously mentioned, set A may refer to a given phonetic sound such as "oo" and specimens A1 through A9 may represent the digitized sound wave patterns of nine different persons speaking the sound "oo." Likewise set B may refer to the sound "ee" and set C may refer to the sound "ah." In another example, set A may represent the letter A and specimens A1 through A9 may be digitized representations of the characteristics of nine different persons handwriting the latter A. Likewise set B may represent the letter B and set C may represent the letter C.

In the embodiment to be described, a specimen identification system will be discussed wherein an unknown specimen, referred to as the input specimen, is introduced to the system.

Referring to FIG. 1, a schematic block diagram is shown wherein three channels are connected to a common input means 10. Channel 1 includes inclusive test means 12, 30, 48, and 66. Channel 2 includes inclusive test means 14, 32, and 50, and channel 3 includes inclusive test means 16, 34, and 52. Input means 10 is the source of the digitized unknown input specimen. Input means 10 may, if the system is employed for character recognition, be an optical reading device which converts the graphic character being scanned into a digital representation of the black and white portions of the character. If the system is to be employed for speech recognition, input means 10 may be a microphone device for receiving spoken sounds and for converting such sounds into a digital equivalent. Broadly, input means 10 produces a digital output signal representing the unknown input specimen to be identified.

The output of input means 10 is a ten-bit binary signal representative of the input specimen, one or more bits of which are coupled to test means 12, 14, 16, 30, 32, 34, 48, 50, 52, and 66. Test means 12 performs what is referred to as an inclusive test for set A, test means 14 performs an inclusive test for set B, and test means 16 performs an inclusive test for set C. The meaning of the term inclusive test will be more clearly understood as the system is described, however it may now be defined as a test which will pass all specimens for which it is designed. Thus, an inclusive test for set A is one which will pass any one of the specimens A1 through A9. The inclusive test for set A should reject as many as possible specimens not belonging to class A. However, as will be shown, the inclusive test for set A will also pass a percentage of specimens belonging to other sets. The criteria for the inclusive test, for example for set A, is that any specimen in set A will be passed, and any rejected specimen will not therefore be a member of set A.

Inclusive test means 12, 14, and 16 respectively include first output leads 18, 20, and 22 and second output leads 24, 26, and 28. The first output leads 18, 20, and 22 will conduct a "pass" indication signal in response to the specimens which pass each respective associated test means and second output leads 24, 26, and 28 will conduct a "reject" indication signal in response to the specimens which are rejected by each associated test means.

Output pass lead 18 from inclusive test means 12 is connected to a second level inclusive test means 30, output pass lead 20 from inclusive test means 14 is connected to a second level inclusive test means 32, and output pass lead 22 from inclusive test means 16 is connected to a second level inclusive test means 34. The inclusive test means 30, 32, and 34 are responsive to given ones of the bits of the input specimen from specimen input means 10, however a pass signal is required on leads 18, 20, and 22 to make test means 30, 32, and 34 to be respectively operative.

It was stated that inclusive test means 12 is designed to pass, that is, to provide a pass signal, onto output lead 18 in response to any specimen belonging to set A and that some specimens belonging to set B and set C may also be passed and provide a pass signal on lead 18. Inclusive test means 30 is an inclusive test for those specimens from sets B and C which may pass the test within inclusive test means 12. Thus, inclusive test means 30 is referred to as performing an inclusive test for those non-set A specimens which are capable of passing inclusive test means 12. Inclusive test means 30 includes a first output "pass" lead 36 and a second output "reject" lead 42. Any specimens of set B and set C which may pass inclusive test means 12 will also pass the test within inclusive test means 30 and will cause a pass signal to appear on output lead 36. All specimens of set A will pass inclusive test means 12 and cause a pass signal to be introduced to inclusive test means 30 on lead 18. Inclusive test means 30 is designed to pass those non-set A specimens, which are capable of passing the test within test means 12, however, a percentage of the specimens of set A will also be capable of passing the test within inclusive test means 30 and will cause a pass signal to appear on output lead 36.

In like manner inclusive test 32 coupled to inclusive test 14 via output pass lead 20 is designed as an inclusive test for non-set B specimens and will be passed those set A and C specimens which passed the test within test means 14, resulting in a pass signal on output lead 20. Inclusive test means 32, while designed to pass all set A and C specimens which passed the test within inclusive test means 14, may also be passed by some percentage of specimens from set B which passed inclusive test means 14. Inclusive test means 34 is coupled to inclusive test means 16 via lead 22 and is designed as an inclusive test for non-set C specimens and will be passed by those set A and B specimens which were passed by inclusive test means 16 resulting in a pass signal on output lead 22. Inclusive test means 34, while designed to pass those set A and B specimens which passed inclusive test means 16, may also be passed by some percentage of specimens from set C passed by inclusive test means 16.

Inclusive test means 30, 32, and 34 also include output reject leads 42, 44, and 46, respectively, which will conduct a reject signal in response to the specimen sets rejected by the tests within associated inclusive test means 30, 32, and 36. Thus, the specimens from set A introduced to inclusive test means 30 which do not pass the test therein will cause a reject signal to appear on lead 42, the specimens of set B introduced to inclusive test means 32 which do not pass the test therein will cause a reject signal to appear on lead 44 and the specimens of set C on lead 22 which are not passed by the test within test means 34 will cause a reject signal to appear on lead 46.

Lead 36 is connected to the input of a third level inclusive test means 48, lead 38 is connected to the input of a third level inclusive test means 50 and lead 40 is connected to the input of a third level inclusive test means 52. A pass signal is required on leads 36, 38, and 40 to respectively make test means 48, 50, and 52 operative. Inclusive test means 48 is similar to inclusive test means 12 in that it includes a test designed to be passed by specimens of set A (i.e., all the specimens of set A meet the requirements of the test), however, it is a narrower test in that inclusive test means 12 is designed to be passed by all specimens within set A whereas inclusive test means 48 is designed to be passed by those specimens of set A which passed the test within inclusive test means 30. Likewise, inclusive test means 50 is designed to be passed by those specimens of set B which passed the test within inclusive test means 32 and inclusive test means 52 is designed to be passed by those specimens of set C which passed the test within inclusive test means 34.

Inclusive test means 48, 50, and 52 each respectively include first "pass" output leads 54, 56, and 58 and second "reject" output leads 60, 62, and 64. Inclusive test means 48 will be passed by all the specimens from set A which also passed the test within test means 30 and may also be passed by a percentage of specimens from sets B and C which passed the test within test means 30. Specimens which are passed by test means 48 produce an output signal on lead 54 and lead 60 will contain an output signal in response to those specimens of sets B and C which are rejected by the test within test means 48. Inclusive test means 50 will be passed by all the specimens from set B which were passed by test means 32 and may also be passed by a percentage of specimens from sets A and C which were passed by test means 32. Specimens which are passed by test means 50 produce an output pass signal on lead 56 and lead 62 will contain a reject signal in response to those specimens of sets A and C which do not pass the test within test means 50. Inclusive test means 52 will be passed by all the specimens from set C which passed the test within test means 34 and may also be passed by a percentage of specimens from sets A and B which passed the test within test means 34. Specimens which are passed by the test within test means 52 result in a pass signal on output lead 58 whereas set A and B specimens which are not passed by the test within test means 52 result in a reject signal on lead 64. Output lead 54 from inclusive test means 48 is connected to the input of a fourth level inclusive test means 66 which is designed to be passed by specimens of non-set A which may be passed by the test within test means 48 and thereby provide a pass signal on output lead 68 and to reject any specimens of set A which may be passed by the test within test means 48 and thereby provide a reject signal on output lead 70.

The structure of FIG. 1 is a specimen identification system designed to identify the specimen set of which any of the twenty-seven specimens set forth in Table I is a member. For this reason, as will be later apparent, it is not necessary that a fourth level of test means be provided for the second (set B) channel and the third (set C) channel. The number of levels of test means required to identify an input specimen as a member of a given specimen set is determined by the quality and number of specimens contained in each of the sets. Furthermore, the specific circuits included in each of the inclusive tests are likewise determined by the specimen sets to be handled by the system.

From the description of the structure of FIG. 1 thus far, it is seen that to handle and ultimately identify a specimen as a member of a given one of a plurality of specimen sets, a test channel for each specimen set is provided. The first channel of FIG. 1 relates to specimen set A, the second channel of FIG. 1 relates to specimen set B and the third channel of FIG. 1 relates to specimen set C. If a greater number of specimen sets were involved, a channel for each would be provided. Each inclusive test means within each channel is connected to a common specimen input means which transmits given bits of the input specimen to each of the inclusive test means. The first level of test means in each channel is designed to be passed by all the specimens within the associated specimen set and may also be passed by some of the specimens of the other specimen sets while rejecting others of the other specimen sets. The second level of test means in each channel is designed to be passed by those specimens of the other sets which are capable of being passed by the first level tests, and may be passed by some of the specimens within the associated specimen set while rejecting others of the associated specimen set. The third level of test means in each channel is again designed to be passed by specimens of the associated specimen set, but the test is narrower in that only those specimens of the associated specimen set which are capable of being passed by the second level test means are considered. Each channel will contain a series of alternate inclusive test means for passing specimens of the associated specimen set and inclusive test means for passing specimens other than those of the associated specimen set. The tests will be progressively narrower since the number of possible specimens to be considered will become less and less as each test level is reached. This is due to the rejection of specimens by the preceding test means.

The system shown in FIG. 1 will be more clearly understood by illustrating the operation in conjunction with the specimen sets A, B, and C set forth in Table I. It was stated that test means 12 (FIG. 1) is designed to be passed by all the specimens of specimen set A. The specimens in set A, namely specimens A1 through A9, are ten-bit binary words which differ from each other and from each of the other specimens in sets B and C. It would be possible to construct a test which recognizes only specimens A1 through A9 and rejects specimens B1 through B9 and C1 through C9. This could be accomplished by storing separate representations of specimens A1 through A9 and comparing the unknown input specimens therewith on a bit-by-bit basis. A match would indicate that the input specimen was a set A specimen and a mismatch would indicate that the input specimen was not a set A specimen. This would involve only one level of testing but would require complex logic and comparator circuits. One of the intentions of the present invention is to avoid such complex test structures and accomplish the specimen recognition by means of a series of simple test means connected in series.

Thus a simple test means which may be passed by any of the specimens in specimen set A of Table I (the criteria for inclusive test means 12) is to design a device to pass any specimen having a "1" bit in the third bit position. This is not a narrow test and consequently specimens B1, B2, B4, B7, and C3 will likewise pass the test and result in a pass signal on pass output lead 18. Specimens B3, B5, B6, B8, B9, C1, C2, C4, C5, C6, C7, C8, and C9, having "0" bits in the third bit position, will fail the test and result in a reject signal on reject output lead 24. For the sake of clarity, the tests performed by each of the inclusive test means in FIG. 1 and the specimens of Table I which pass or fail such tests are set forth below in more or less tabular form.

(1) FIRST LEVEL TESTS

Test means 12—
 Intent: To pass all specimens in specimen set A.
 Test criteria: "1" bit in third bit position.
 Specimens which may pass and produce a pass signal on lead 18: A1 through A9 and B1, B2, B4, B7, and C3.
 Specimens which fail and produce a reject signal on lead 24: B3, B5, B6, B8, B9, C1, C2, C4, C5, C6, C7, C8, and C9.

Test means 14—
 Intent: To pass all specimens in specimen set B.
 Test criteria: "0" bit in eighth bit position.
 Specimens which may pass and produce a pass signal on lead 20: B1 through B9 and A2, A3, A5, A6, C1, C2, and C7.
 Specimens which fail and produce a reject signal on lead 26: A1, A4, A7, A8, A9, C3, C4, C5, C6, C8, and C9.

Test means 16—
 Intent: To pass all specimens in specimen set C.
 Test criteria: "1" bits in the fourth, fifth, and tenth bit positions or a "0" bit in the third bit position.
 Specimens which may pass and produce a pass signal on lead 22: C1 through C9 and B3, B5, B6, B8, and B9.
 Specimens which fail and produce a reject signal on lead 28: B1, B2, B4, B7 and A1 through A9.

(2) SECOND LEVEL TESTS

Test means 30—
 Intent: To pass all non-set A specimens which can pass test means 12 (i.e., B1, B2, B4, B7, and C3).
 Test criteria: "1" bit in second bit position.
 Specimens which may pass and produce a pass signal on lead 36: B1, B2, B4, B7, C3 and A2, A4, and A6.
 Specimens which fail and produce a reject signal on lead 42: A1, A3, A5, A7, A8, and A9.

Test means 32—
 Intent: To pass all non-set B specimens which can pass test means 14 (i.e., A2, A3, A5, A6, C1, C2, and C7).
 Test criteria: "1" bit in third bit position and "0" bit in fifth bit position, or "0" bits in first, third, and eighth bit positions and "1" bits in sixth and tenth bit positions.
 Specimens which may pass and produce a pass signal on lead 38: A2, A3, A5, A6, C1, C2, C7, and B1.
 Specimens which fail to produce a reject signal on lead 44: B2 through B9.

Test means 34—
 Intent: To pass all non-set C specimens which can pass test means 16 (i.e., B3, B5, B6, B8, and B9).
 Test criteria: "0" bit in eighth bit position.
 Specimens which may pass and produce a pass signal on lead 40: B3, B5, B6, B8, B9, and C1, C2, and C7.
 Specimens which fail and produce a reject signal on lead 46: C3, C4, C5, C6, C8, and C9.

(3) THIRD LEVEL TESTS

Test means 48—
 Intent: To pass all set A specimens which can pass test means 30 (i.e., A2, A4, and A6).
 Test criteria: "0" bit in first bit position.
 Specimens which may pass and produce a pass signal on lead 54: A2, A4, A6, and C3.

Specimens which fail and produce a reject signal on lead 60: B1, B2, B4, and B7.

Test means 50—
 Intent: To pass all set B specimens which can pass test means 32 (i.e., B1).
 Test criteria: "1" bits in first, second, third, and fourth bit positions and "0" bits in fifth, sixth, seventh, eighth, ninth, and tenth bit positions.
 Specimens which may pass and produce a pass signal on lead 56: B1
 Specimens which fail and produce a reject signal on lead 62: A2, A3, A5, A6, C1, C2, and C7.

Test means 52—
 Intent: To pass all set C specimens which can pass test means 34 (i.e., C1, C2, and C7).
 Test criteria: "0" bits in first and third bit positions and "1" bits in sixth and tenth bit positions.
 Specimens which may pass and produce a pass signal on lead 58: C1, C2, and C7.
 Specimens which fail and produce a reject signal on lead 64: B3, B5, B6, B8, and B9.

NOTE: Only set B specimens (i.e., B1) will be capable of producing a pass signal on output pass lead 56 of test means 50 and only set C specimens (i.e., C1, C2, and C7) will be capable of producing a pass signal on output pass lead 58 of test means 52. Therefore, no further test levels are necessary for channel 2 and channel 3. A pass signal on output pass lead 54 of test means 48, however, can be produced by a set C specimen (i.e., C3) in addition to the set A specimens A2, A4, and A6. It is therefore necessary that channel 1 have a fourth level test means.

(4) FOURTH LEVEL TEST

Test means 66—
 Intent: To pass all non-set A specimens which can pass test means 48 (i.e., C3).
 Test criteria: "1" bits in eighth and ninth bit positions.
 Specimens which may pass and produce a pass signal on lead 68: C3.
 Specimens which fail and produce a reject signal on lead 70: A2, A4, and A6.

Figure 2:
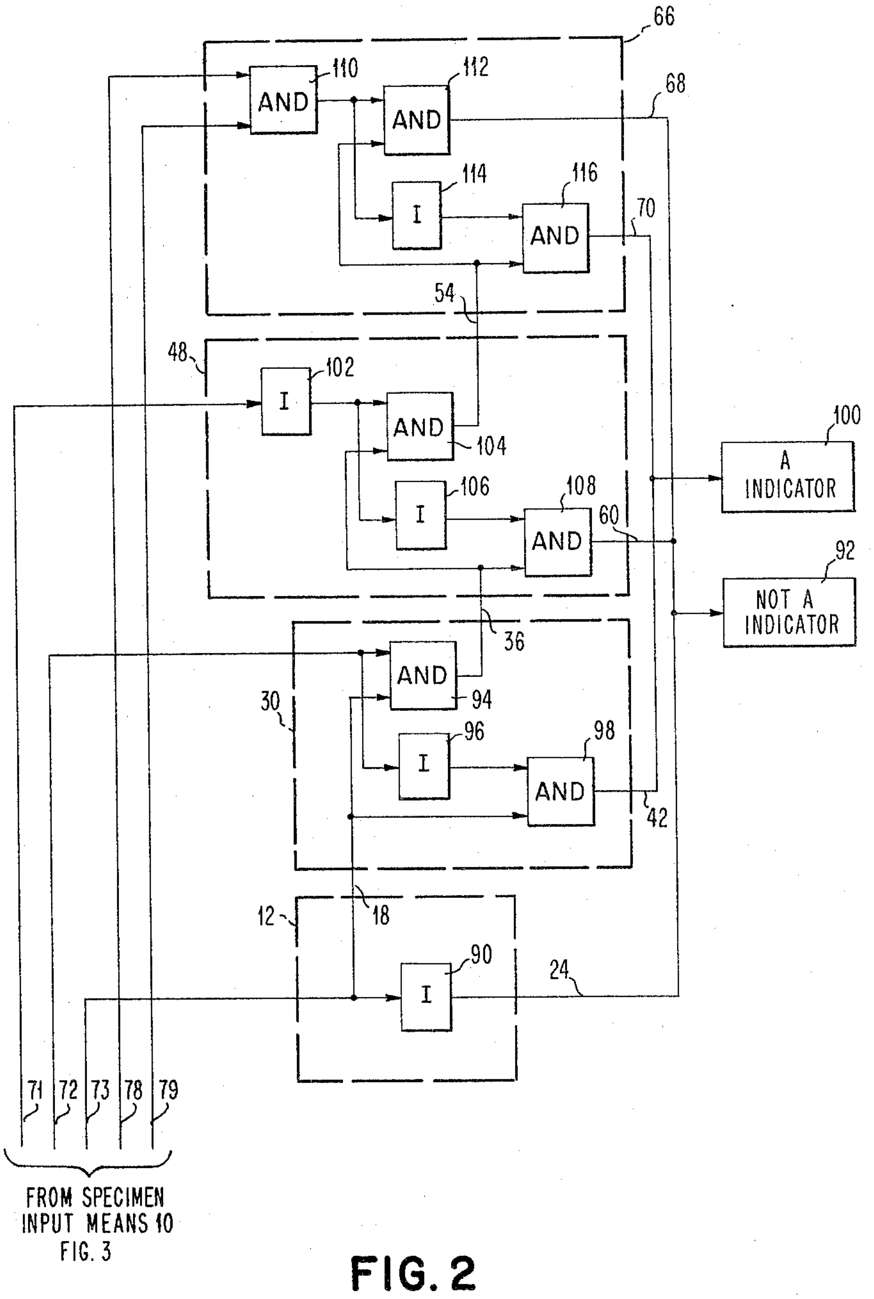
FIG. 2 is a block diagram showing the details of channel 1 of the embodiment of FIG. 1.
Figure 3:
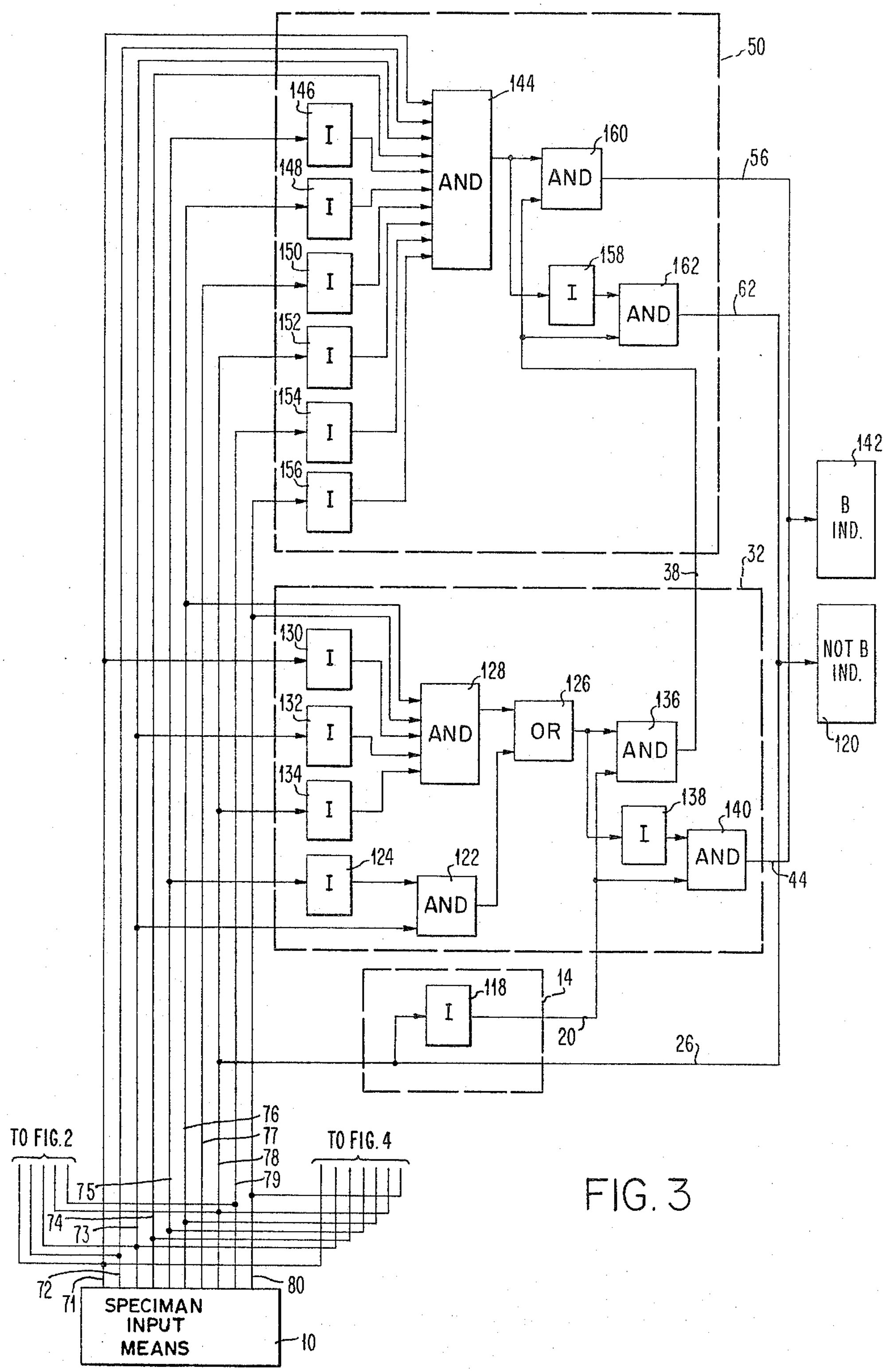
FIG. 3 is a block diagram showing the details of channel 2 of the embodiment of FIG. 1.
Figure 4:
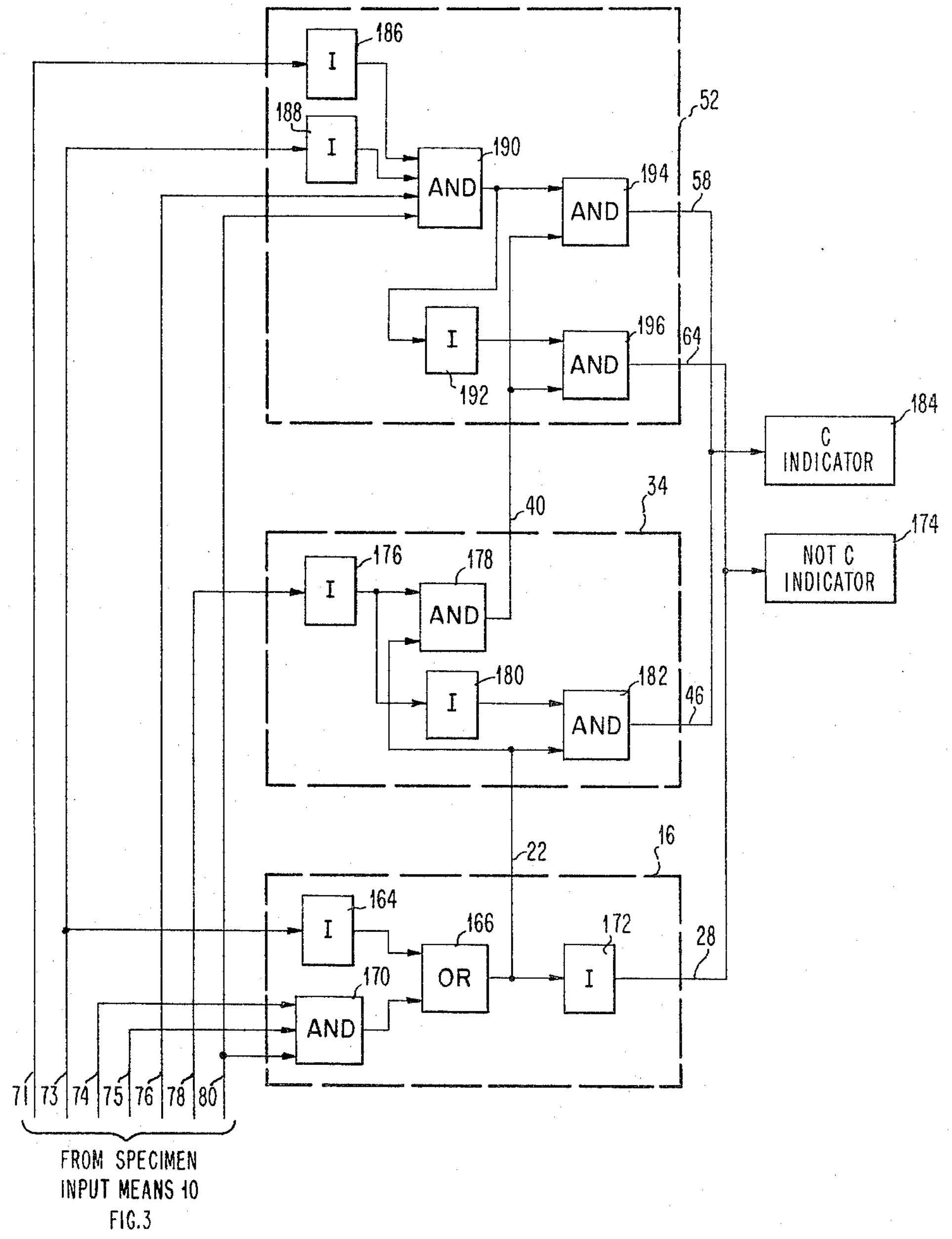
FIG. 4 is a block diagram showing the details of channel 3 of the embodiment of FIG. 1.

The circuits employed for each of the test means 12, 14, 16, 30, 32, 34, etc., is determined by the test criteria for each test means. In FIGS. 2, 3, and 4 the circuits for the test means in channels 1, 2, and 3 respectively are shown. The circuits shown in FIGS. 2, 3, and 4 are designed to perform exclusive tests relative to the specimens set forth in sets A, B, and C of Table I. It is to be understood that the particular circuits employed in the inclusive test depicted in FIG. 1 will vary in accordance with the particular speciment sets with which the system is to be used. Likewise the number of test levels necessary in each test channel will also vary in accordance with the particular specimen sets under consideration. Generally the number of levels necessary in the test channels of a given system will be a function of the relative similarity of the specimens in each set to the specimens in each of the other sets being employed.

Each of the channels 1, 2, and 3 contains indicator devices which indicate whether the input specimen is or is not a member of the specimen set associated with the channel. Channel 1 includes an "A" indicator device 100 coupled to reject leads 70 and 42 and a "not A" indicator device 92 coupled to pass leads 60 and 68 and reject lead 24. Channel 2 includes a "B" indicator device 142 connected to pass lead 56 and reject lead 44 and a "not B" indicator device 120 connected to reject leads 26 and 62. Channel 3 includes a "C" indicator device 184 connected to pass lead 58 and reject lead 46 and a "not C" indicator device 174 connected to reject lead 46 and 64. The operation of the indicator devices will be described relative to the discussion of FIGS. 2, 3, and 4 to follow.

Referring to FIG. 2, the circuits included in each of the inclusive test means 12, 30, 48, and 66 of channel 1 of FIG. 1 are shown. As previously stated, inclusive test means 12 tests for a "1" bit in the third bit position of the input specimen; inclusive test means 30 tests for a "1" bit in the second bit position of the input specimen; inclusive test means 48 tests for a "0" bit in the first bit position of the input specimen; and inclusive test means 66 tests for "1" bits in both the eighth and ninth bit positions of the input specimen.

Referring now to FIG. 3, the specimen input means 10 of FIG. 1 is shown having ten output leads therefrom numbered from 71 through 80 and respectively associated with the first through the tenth bit positions of the input specimen. As stated hereinabove, specimen input means 10 is the means by which an input specimen is received. Specimen input means 10 may be an optical scanner for pattern recognition applications, a microphone device for speech recognition applications, or any other suitable transducer depending on the environment to which the specimen recognition device is to be applied. Since the present explanation is directed to specimens in the form of ten-bit binary words, specimen input means 10 may also include an analog-to-digital converter to convert the received specimen into a ten-bit digital representation and to apply the bits thereof to the ten output leads 71 through 80 via a storage register or the like. Particular ones of output leads 71 through 80 are connected to the separate inclusive test means in each of the three test channels.

Referring again to FIG. 2, inclusive test means 12 determines whether a "1" bit is present in the third bit position of the input specimen and, if present, will provide an output indication on pass lead 18. If a "0" bit is present in the third bit position of the input specimen, inclusive test means 12 provides an output indication on reject lead 24. Thus, inclusive test means 12 is connected to lead 73 (associated with the third bit position of the input specimen from specimen input means 10 of FIG. 3) and includes only an inverter circuit 90. If a "1" bit is present on lead 73, it indicates that the input specimen may be a member of set A, and therefore the signal is merely connected onto pass lead 18. If a "0" bit is present in the third bit position, it indicates that the input specimen cannot be an "A" and zero signal is applied to pass lead 18. The zero signal on lead 73 is however converted to a complementary "1" bit signal by inverter 90 and is applied to reject lead 24 which is connected to a "not A" indicator device 92 (i.e., a lamp) to indicate that the input specimen is not a member of set A.

Presume that a "1" bit is present on lead 73 and an output signal is thereby present on pass lead 18 indicating that the input specimen may be a member of set A. The second level inclusive test 30 is a test for all members of set B and C capable of passing inclusive test 12. It was stated that inclusive test 30 tests for a "1" bit in the second bit position of the input specimen, and is therefore connected to lead 72. It is necessary to perform inclusive test 30 only if inclusive test 12 has been "passed." Thus a "1" bit signal on lead 72 should produce a pass signal on pass lead 36 of test 30 only if a "1" bit pass signal is present on pass lead 18 of test 12. This is accomplished by connecting lead 72 and lead 18 to "AND" circuit 94. Thus, a "1" bit on lead 72 and a pass signal (also a "1" bit) is required in order to provide a "1" bit pass signal on pass lead 36. If a "0" bit is present on lead 72 it is indicative that the input specimen is not a member of set B or set C capable of passing test means 12 and therefore must be a member of set A. A "0" bit on lead 72 is therefore applied to an inverter circuit 96, the output of which is a complementary "1" bit signal. The output signal from inverter circuit 96 is also only valid if test means 12 was "passed," therefore the output of inverter circuit 96 is coupled to "AND" circuit 98 with pass lead 18. A pass signal ("1" bit) on lead 18 and a "0" bit on lead 72 (converted to a "1" bit by inverter 96) will be gated through "AND" circuit 98 onto reject lead 42. A reject signal on lead 42 is indicative that the input specimen is a member of set A and is therefore connected to an A indicator device 100 (such as a lamp). If a "0" bit were present on lead 73, there of course would not be a pass signal ("1" bit) present on pass lead 36.

Presume that a "1" bit is present in the second and third bit positions of the input specimen, producing a "1" bit pass signal on lead 36 indicating that the input specimen may be a member of set "A" and that the third level inclusive test means 48 is to be applied. Inclusive test means 48 tests for a "0" bit in the first bit position of the input specimen and is therefore connected to lead 71. A "0" bit on lead 71 should produce a "1" bit pass signal on pass lead 54 and therefore an inverter circuit 102 is connected to lead 71. A "1" bit output signal from inverter circuit 102 indicates that test 48 has been passed, however, before a "1" bit pass signal can be provided on pass lead 54 it is also necessary that inclusive test 30 be also passed. Thus the output of inverter circuit 102 is connected along with pass lead 36 from test 30 to an "AND" circuit 104. A "0" bit signal on lead 71 (inverted to a complementary "1" bit by inverter circuit 102) and a "1" bit pass signal on lead 36 will gate "AND" circuit 104 and provide a "1" bit pass signal on pass lead 54 indicating that the input specimen may be a member of set A.

If a "1" had been present on lead 71, it would be indicative that the input specimen is not a member of set A. In such instance a "0" bit signal would be produced from inverter circuit 102, "AND" circuit 104 would be degated, and no "1" bit pass signal would be provided on lead 54. Instead, the "0" bit output signal from inverter circuit 102 is applied to inverter circuit 106 which produces a complementary "1" bit output signal which is applied to "AND" circuit 108. If test means 30 had been passed and a "1" bit pass signal is present on lead 36, "AND" circuit 108 is gated and a "1" bit signal is provided on reject lead 60 indicating that the input specimen is not a member of set A. The "1" bit signal on reject lead 60 is therefore applied to the "not A" indicator device 92.

Presuming that "1" bits are present in the second and third bit positions and a "0" bit is present in the first bit position of the input specimen, a "1" bit pass signal will be present on pass lead 54 indicating that the input specimen may be a member of set A and that the fourth level test is necessary. Inclusive test means 66 is designed to pass members of specimen sets B and C which are capable of passing the previous test means 12, 30, and 48. Inclusive test means 66 tests for the presence of "1" bits in the eighth and ninth bit positions of the input specimen. An "AND" circuit is connected to leads 78 and 79 and will be gated when "1" bits are present in the eighth and ninth bit positions of the input specimen. Test means 66 is necessary only when test means 48 has been passed, and therefore the output of "AND" circuit 110 is connected to an "AND" circuit 112 along with pass lead 54. A "1" bit output from "AND" circuit 110 and a "1" bit pass signal on lead 54 will gate "AND" circuit 112 and provide a "1" bit output signal on pass lead 68. Test means 66 is a test for members of sets B and C which are capable of passing the previous test means 12, 30, and 48. Test means 66 is also the last required test and a "1" bit pass signal therefrom on lead 68 is indicative that the input specimen is not a member of set A. Pass lead 68 is therefore connected to "not A" indicator device 92.

If the signal on lead 78 and/or 79 is not a "1" bit, the output signal from "AND" circuit 110 will be a "0" bit and a pass signal will not be provided on lead 68. Instead, the "0" bit signal from "AND" circuit 110 is applied to inverter circuit 114, producing a "1" bit output signal therefrom which is applied to "AND" circuit 116. A "1" bit on lead 54 will gate "AND" circuit 116 providing a "1" bit output signal on reject lead 70. A signal on reject lead 70 is indicative that the input specimen is a member of set A and is consequently applied to A indicator device 110.

It is seen that each of the inclusive test means in FIG. 2, with the exception of test means 12, requires a "1" bit pass signal from the preceding test means in order to produce an output. Thus, test means 12 will either produce a "not A" indication or else apply a pass signal to test means 30. Test means 30, receiving a pass signal from test means 12, will either produce an "A" indication or else apply a pass signal to test means 48. Test means 48, receiving a pass signal from test means 30, will either produce a "not A" indication or else apply a pass signal to test means 66. Test means 66, receiving a pass signal from test means 48, will either produce an "A" indication or a "not A" indication.

Referring to FIG. 3, the channel 2 inclusive test for specimens of set B are shown. Inclusive test means 14 is designed to test for the presence of a "0" bit in the eighth bit position of the input specimen in order to pass all members of specimen set B. Thus, an inverter circuit 118 is connected to lead 78 of specimen input means 10 to produce a "1" bit output signal upon the occurrence of a "0" bit on lead 78. The "1" bit output signal from inverter circuit 118 is indicative that the input specimen may be a member of set B and is applied to pass lead 20 as a pass signal so that a second level test may be performed and a "0" bit is present on reject lead 26. If the signal on lead 78 is a "1" bit, inverter circuit 118 insures that there will not be a "1" bit pass signal applied to pass lead 20 and instead the "1" bit signal is applied to reject lead 26. A "1" bit signal on lead 78 is indicative that the input specimen is not a member of set B and is therefore connected to a "not B" indicator device 120 via reject lead 26.

The second level inclusive test means 32 is designed to pass all set A and set C specimens also capable of passing test means 14. Test means 32 performs two tests; either for a "1" bit in the third bit poition and a "0" bit in the fifth bit position of the input specimen, or for "0" bits in the first, third, and eighth bit positions and "1" bits in the sixth and tenth bit positions of the input specimen. Thus, lead 73 is connected directly to an "AND" circuit 122 and lead 75 is connected to "AND" circuit 122 through an inverter circuit 124. The output of "AND" circuit 122 is connected to "OR" circuit 126. Also, leads 76 and 80 are directly connected to "AND" circuit 128 and leads 71, 73, and 78 are connected to "AND" circuit 128 via inverter circuits 130, 132, and 134, respectively. The output of "AND" circuit 128 is also connected to "OR" circuit 126. It can be seen that the occurrence of either or both of the two aforesaid test conditions will produce a "1" bit output signal from "OR" circuit 126. This indicates that the input specimen may be a member of set B and is the pass signal for the next level test, however, before it can be applied to pass lead 38, the condition that previous test means 14 be also passed must be satisfied. Thus, the output of "OR" circuit 126 is connected to "AND" circuit along with pass lead 20 from test means 14. A "1" bit on lead 20 will gate the "1" bit from "OR" circuit 126 onto pass lead 38.

If both the aforesaid test conditions are not met, "OR" circuit 126 will produce a "0" bit output signal and no pass signal will be applied to lead 38. Instead, the "0" bit signal from "OR" circuit 126 is applied to inverter circuit 138 which will produce a "1" bit output signal to be applied on reject lead 44. The "1" bit output signal from inverter circuit 138 must also be "ANDed" with the signal on lead 20 and this is accomplished by "AND" circuit 140. The reject signal on lead 44 is indicative that the input specimen is a member of set B and is therefore applied to "B" indicator 142.

Inclusive test means 50 tests for all members of set B which may pass test means 32. The test criteria is "1" bits in the first, second, third, and fourth bit positions and "0" bits in the fifth, sixth, seventh, eighth, ninth, and tenth bit positions of the input specimen. Consequently, leads 71, 72, 73, and 74 are connected directly to "AND" circuit 144 and leads 75, 76, 77, 78, 79, and 80 are connected to "AND" circuit 144 via inverter circuits 146, 148, 150, 152, 154, and 156, respectively. If the test criteria is met, a "1" bit is produced by "AND" circuit 144 which will be applied on pass lead 56 to "B" indicator 142 and if the test criteria is not met, a "0" bit is produced by "AND" circuit 144 which is inverted to a "1" bit signal by inverter circuit 158 and applied to "not B" indicator 120 via lead 62. Before the test results from "AND" circuit 144 can be employed, it is necessary that a "1" bit pass signal be present on pass lead 38 from test means 32. Therefore the outputs of "AND" circuit 144 and inverter circuit 158 are gated with the signal on lead 38 by "AND" circuits 160 and 162, respectively.

Referring now to FIG. 4, the third channel test for specimens of set C are shown. Inclusive test means 16 is designed to test for two conditions, either "1" bits in the fourth, fifth, and tenth bit positions of the input specimen or a "0" bit in the third bit position of the input specimen. Thus lead 73 from specimen input means 10 (FIG. 3) is connected through an inverter circuit 164 to an "OR" circuit 166 to produce a "1" bit output signal therefrom when there is a "0" bit on lead 73. Also, leads 74, 75, and 80 are connected through "AND" circuit 170 to "OR" circuit 166 to produce a "1" bit output therefrom when there are "1" bits present on leads 74, 75, and 80. If both test criteria are not met, a "0" bit output signal will be produced by "OR" circuit 166. A "1" bit signal from "OR" circuit 166 is applied on pass lead 22 as a pass signal and a "0" bit signal from "OR" circuit 166 is converted to a "1" bit signal by inverter circuit 172 and applied on reject lead 28 as a reject signal. A reject signal on lead 28 is indicative that the input specimen is not a member of set C, therefore lead 28 is connected to "not C" indicator device 174.

Second level inclusive test means 34 is designed to pass all set A and B specimens also capable of passing test means 16. Test means 34 tests for a "0" bit in the eighth bit position of the input specimen and therefore includes an inverter circuit 176 connected to lead 78 to produce a "1" bit output signal in response to a "0" bit on lead 78. The "1" bit output signal from inverter circuit 176 when applied to "AND" circuit 178 with a "1" bit signal present on pass lead 22 from test means 16, a "1" bit pass signal will be applied to pass lead 40. The "0" bit output signal from inverter circuit 176 is inverted to a "1" bit signal by inverter circuit 180 and is applied to "AND" circuit 182. A "1" bit pass signal on lead 22 will gate "AND" circuit 182 and provide a "1" bit reject signal on reject lead 46 which is in turn connected to a "C" indicator device 184.

Third level inclusive test means 52 is designed to pass those set C specimens which may also pass test means 34 and 16. Test means 52 tests the input specimen for "0" bits in the first and third bit positions and "1" bits in the sixth and tenth bit positions. Thus leads 71 and 73 are respectively connected through inverter circuits 186 and 188 to "AND" circuit 190 and leads 76 and 80 are directly connected to "AND" circuit 190. A "1" bit output signal from "AND" circuit 190 is indicative that the input specimen is a member of set C and is applied to "C" indicator device 184 via pass lead 58. A "0" bit output signal from "AND" circuit 190 is indicative that the input specimen is not a member of set C and is converted ot a "1" bit signal by inverter circuit 192 and applied to "not C' indicator device 174 via reject lead 64. The output signals from test means 52 are only applied to indicator devices 174 and 184 if test means 40 has been passed, therefore the signal on lead 40 is "ANDed' with the output signal from "AND" circuit 190 at "AND" circuit 194 and with the output signal from inverter circuit 192 at "AND" circuit 196.

It might be noted that when no input specimen is present at the output of specimen input means 10 of FIG. 2, that inverter circuit 90 of FIG. 2 will tend to produce a "1" bit output signal to actuate indicator device 92 and that inverter circuit 172 of FIG. 4 will likewise tend to produce a "1" bit output signal to actuate indicator device 174. However, the various logic circuits and indicator devices of FIGS. 2, 3, and 4 require a power supply which has not been shown for purposes of clarity. It is presumed that such power supply is disconnected when no input specimen is being employed. In lieu of this presumption it will be obvious to one skilled in the art that a simple inhibit means may be provided to inhibit such irrelevant outputs from inverter circuits 90 and 172 when no input specimen is present.

The system of FIG. 1, more particularly illustrated in FIGS. 2, 3, and 4, provides an identification as to which specimen set an input specimen from Table I is a member. If the input specimen is a member of set A, "A" indicator device 100, "not B" indicator device 120, and "not C" indicator device 174 are actuated. Likewise if the input specimen is a member of set B, indicator devices 92, 142, and 174 are actuated and if the input specimen is a member of set C, indicator devices 92, 120, and 184 are actuated. With a system designed according to the principles of the present invention and operated with the specimens set forth, a substitution error, that is, a specimen of one set being identified as a member of a different set, will not occur.

The inclusive test means of the three channels shown in FIG. 1 and more fully illustrated in FIGS. 2, 3, and 4 provide a determination of whether an input specimen is a member of specimen set A, B, or C. Presume that it is desired that the system be expanded so that it will provide a recognition of the members of an additional one or more specimen sets. Ordinarily, the addition of a test for one or more new specimen sets to an already existing specimen identification system cannot be readily accomplished without re-designing the tests of the existing system. As will be seen, the present invention includes the advantage that an additional specimen test channel may be added to the present system without the tests already designed for the existing system.

Consider a new specimen set such as set D as follows:

SET D

| | 1 | 2 | 3 | 4 | 5 | 6 | 7 | 8 | 9 | 10 |
|---|---|---|---|---|---|---|---|---|---|---|
| D1 | 0 | 1 | 0 | 1 | 0 | 1 | 0 | 1 | 0 | 1 |
| D2 | 1 | 0 | 1 | 1 | 1 | 1 | 0 | 0 | 1 | 1 |
| D3 | 1 | 1 | 1 | 1 | 1 | 1 | 0 | 0 | 1 | 1 |
| D4 | 0 | 1 | 1 | 1 | 1 | 1 | 0 | 0 | 1 | 1 |
| D5 | 1 | 0 | 1 | 1 | 0 | 0 | 0 | 0 | 1 | 1 |
| D6 | 1 | 1 | 0 | 0 | 1 | 1 | 0 | 0 | 1 | 0 |
| D7 | 1 | 0 | 1 | 1 | 0 | 0 | 1 | 1 | 1 | 1 |

Figure 5:
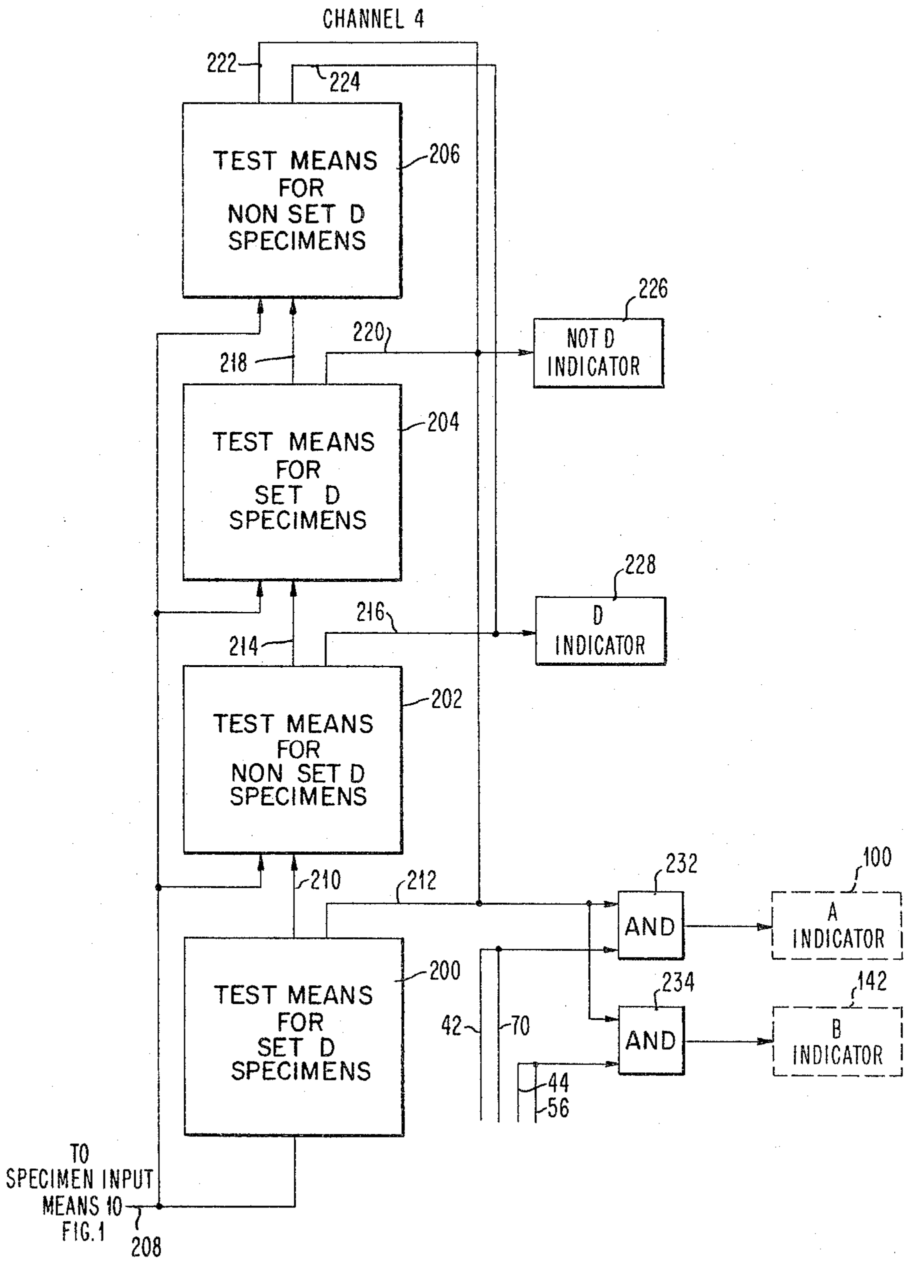
FIG. 5 is a block diagram of a further channel 4 which may be added to the embodiment of FIG. 1.

Input specimen means 10 of FIG. 1 will now be considered capable of providing an input specimen which may be any of the specimens D1 through D7 as well as any of the specimens in set A, set B, and Set C of FIG. 1. Referring to FIG. 5, a block diagram of the inclusive test means for specimen set D is shown which is added to the test means of channels 1, 2, and 3 of FIG. 1. The inclusive test means for specimen set D includes a first level test means 200, a second level test means 202, a third level test means 204, and a fourth level test means 206. Each of the inclusive test means are connected to given ones of the output leads of specimen input means 10 (FIG. 1) via cable 208. Inclusive test means 200 performs an inclusive test for all the members of specimen set D and when passed, provides a signal on pass lead 210 to inclusive test means 202 and when failed provides a signal on reject lead 212. Inclusive test means 202 performs an inclusive test for all members of specimen sets A, B, and C which are capable of passing test means 200. Test means 202, when passed, provides a signal on pass lead 214 to inclusive test means 204 and when failed provides a signal on reject lead 214. Inclusive test means 204 performs a test for all members of specimen set D capable of passing test means 200 and test means 202. Test means 204, when passed, provides a signal on pass lead 216 to inclusive test means 206 and when failed provides a signal on reject lead 220. Inclusive test means 206 performs a test for all members of specimen sets A, B, and C capable of passing test means 200, 202, and 204. Test means 206, when passed, provides an output signal on pass leads 222 and when failed provides a signal on reject lead 206. As will be seen when the specimens of set D are actually considered, only four levels of test means are required for specimen identification'.

Test means 200 performs an inclusive test for all members of specimen set D. It is also possible that members of specimen set A, B, and C are also capable of passing test means 200. The tests employed and the specimens which pass or are rejected by the test means of FIG. 4 are determined by an examination of the specimens of sets A, B, C, and D. For purposes of clarity, the test criteria and the specimens which pass or fail such tests employed in FIG. 4 are set forth in tabular form.

(1) Test means 200—
- Intent: To pass all specimens of specimen set D.
- Test criteria: "1" bits in fourth and tenth and "0" bit in seventh bit positions, or "1" bits in first and ninth bit positions.
- Specimens which produce a pass signal on lead 210: D1 through D7, A1, A3, A7, B4, B8, C3, C4, and C9.
- Specimens which produce a reject signal on lead 212: A2, A4, A5, A6, A8, A9, B1, B2, B3, B5, B6, B7, B9, C1, C2, C5, C6, C7, and C8.

(2) Test means 202—
- Intent: To pass all non-set D specimens which can pass test means 200 (i.e., A1, A3, A7, B4, B8, C3, C4, and C9).
- Test Criteria: "1" bits in third and tenth bit positions, or "1" bit in ninth bit position.
- Specimens which produce a pass signal on lead 214: A1, A3, A7, B4, B8, C3, C4, C9, and D2 through D7.
- Specimens which produce a reject signal on lead 216: D1.

(3) Test means 204—
- Intent: To pass all set D specimens which can pass test means 202 (i.e., D2 through D7).
- Test criteria: "0" bits in seventh and eighth and "1" bit in ninth bit position, or "1" bits in third, seventh, eighth, ninth and tenth bit positions.
- Specimens which produce a pass signal on lead 218: A3 and D2 through D7.
- Specimens which produce a reject signal on lead 220: A1, A7, B4, B8, C3, C4, and C9.

(4) Test means 206—
- Intent: To pass all non-set D specimens which can pass test means 204 (i.e., A3).
- Test criteria: "1" bits in first, third, fourth and sixth bit positions and "0" bit in the fifth bit position.
- Specimens which produce a pass signal on lead 222: A3.
- Specimens which produce a reject signal on lead 224: D2 through D7.

There being no set D specimens capable of producing a pass signal on lead 222 and there being no non-set D specimens capable of producing a reject signal on lead 224, there is no necessity for any further test means.

Test means 200, being an inclusive test for all specimens of set D, a signal on reject lead 212 is indicative that the input specimen is not a set D specimen and therefore lead 212 is connected to a "not D" indicator device 226. Test means 202 being an inclusive test for all set A, B, and C speciments capable of passing test means 200, a signal on reject lead 216 is indicative that the input specimen is a member of specimen set D and therefore lead 216 is connected to a "D" indicator device 228. Test means 204, being an inclusive test for all set D specimens capable of passing test means 200 and 202, a signal on reject lead 220 is indicative that the input specimen is not a member of set D and therefore lead 220 is connected to "not D" indicator device 226. Test means 206, being an inclusive test for all set A, B, and C specimens capable of passing test means 200, 202, and 204, a signal on reject lead 224 is indicative that the input specimen is a member of set D and therefore lead 224 is connected to "D" indicator 228. Being the final test means, a signal on pass lead 222 of test means 206 is indicative that the input specimen is not a member of set D and therefore lead 222 is connected to "not D" indicator 226.

The members of specimen set D were not taken into consideration when the test means for specimens of sets A, B, and C of FIG. 1 were designed. It is therefore possible that an input specimen which is a member of set D might meet all the test criteria and be incorrectly identified as a member of set A, B, or C by the test means in FIG. 1. In the present example, this will actually be the case. By applying the specimens D1 through D7 of set D against the test criteria of the test means shown in FIG. 1 it can be seen that specimens D2, D3, D4, D5, and D7 will be capable of passing test means 12 and will produce a pass signal on lead 18 causing test means 30 to be applied. As a result, specimens D3 and D4 will produce a signal on pass lead 36 and specimens D2, D5, and D7 will produce a signal on reject lead 42 causing an incorrect actuation of "A" indicator device 100. The specimens D3 and D4 which produce a signal on pass lead 36 cause the test of test means 48 to be performed as a result of which specimen D4 will produce a signal on pass lead 54 and specimen D3 will produce a signal on reject lead 60. Test means 66 will be actuated by specimen D4 and specimen D4 will produce a signal on reject lead 70 which will erroneously actuate "A" indicator device 100.

Likewise, specimens D2, D3, D4, D5, and D6 are capable of passing the test of test means 14 and of these, specimens D2, D3, D4, and D6 will produce a signal on reject lead 44 of test means 32 causing an incorrect actuation of "B" indicator device 142. No set D specimens are capable of passing the test of test means 16.

It is therefore seen that any of the specimens D2, D3, D4, and D5 will simultaneously actuate "A" indicator device 100, "B" indicator device 142, and "D" indicator device 228 (FIG. 5). Specimen D6 will simultaneously actuate "B" indicator device 142 and "D" indicator device 228 and specimen D7 will simultaneously actuate "A" indicator device 100 and "D" indicator device 228. These are what have been previously referred to as substitution errors, being incorrect identification of set D specimens as members of sets A and/or B, and, as previously stated, are undesirable. However, it is to be noted that while a set D specimen may be indicated as an A and/or B specimen by indicator devices 100 and 142, it is also actuating the "D" indicator device 228.

The fact that combination of "A," "B," and "D" indicator devices 100, 142, and 228 may be simultaneously actuated does not mean that an identification may not be made. The results are nevertheless meaningful due to the fact that although the set A and set B test means are capable of erroneously responding to a member of set D, the test means of FIG. 5 associated with a set D have been designed with a knowledge of the members of sets A, B, and C. Therefore, on the occurrence of conflicting identification between a set D and set A and/or B, the identification that the input specimen as a member of set D is more valid and should prevail. A means of automatically accomplishing this is shown in FIG. 5. The input lead to "not D" indication device 226 is also connected as inputs to "AND" circuits 232 and 234. The other input to "AND" circuit 232 is the junction of leads 42 and 70 which are normally connected to "A" indicator device 100 of FIG. 1. The output of "AND" circuit 232 is now connected to "A" indicator device 100. Likewise, the other input to "AND" circuit 234 is the junction of leads 42 and 56 normally connected to "B" indicator device 142 of FIG. 1. The output of "AND" circuit 234 is now connected to the input of "B" indicator device 142. With this modified arrangement the set A and set B indications will be carried out as previously described for FIG. 1 unless a simultaneous actuation of "D" indicator device 228 occurs. In such instance the input signal to the "not D" indicator device 226 will be a "0" bit, which causes "AND" circuits 232 and 234 to be degated so that the "A" indicator device 100 and/or the "B" indicator device 142 will not be erroneously actuated and no substitution errors occur. If the input specimen is actually a member of set A or set B the input signal to the "not D" indicator device will be a "1" bit and "AND" circuits 232 and 234 will be in a gating condition.

Figure 6:
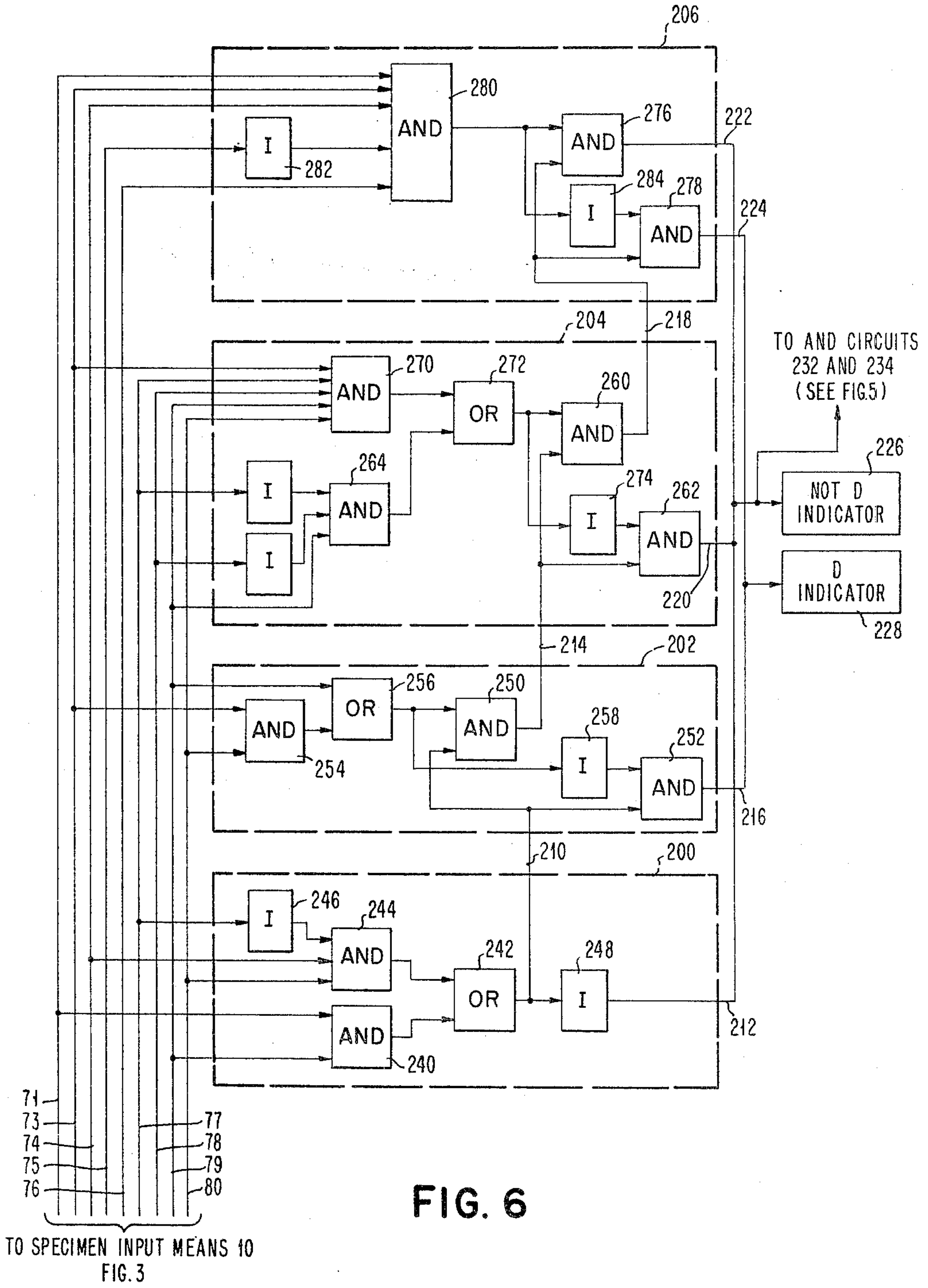
FIG. 6 is a block diagram showing the details of channel 4 of FIG. 5.

Referring to FIG. 6, the specific circuits for test means 200, 202, 204, and 206 are shown in detail. Test means 200 performs an inclusive test for all members of specimen set D. Test means 200 tests for either "1" bits in the fourth and tenth and a "0" bit in the seventh bit positions of the input specimen or for "1" bits in the first and ninth bit positions of the input specimen. Thus, test means 200 includes an "AND" circuit 240 connected to leads 71 and 79 of specimen input means 10 (FIG. 3). The output of "AND" circuit 240 is connected to "OR" circuit 242. An "AND" circuit 244 is connected to leads 74 and 80 and to lead 77 through inverter circuit 246. The outputs of "AND" circuit 244 are also connected to "OR" circuit 242 so that if either of the test conditions are satisfied, a "1" bit signal is provided at the output of "OR" circuit 242 and applied to lead 210 as a pass signal. If either of the test conditions are not satisfied, the "0" bit output from "OR" circuit 242 is converted to a "1" bit signal by inverter circuit 248 and applied to lead 212 as a reject signal. A "1" bit reject signal on lead 212 is indicative that the input specimen is not a member of set D and is therefore applied to "not D" indicator device 226.

If the test conditions of test means 200 are satisfied, a "1" bit signal is applied to lead 210 and applied to "AND" circuits 250 and 252 of test means 202. Test means 202 performs an inclusive test for members of specimen sets A, B, and C which are capable of passing test means 200. Test means 202 includes an "AND" circuit 254 coupled to leads 73 to 80, the output of which is coupled to an "OR" circuit 256. The other input of "OR" circuit 256 is coupled to lead 79, and if either of the test conditions are satisfied, a "1" bit signal will be produced from "OR" circuit 256 and will be gated by a "1" bit signal on lead 210 at "AND" circuit 250 to provide a "1" bit pass signal on lead 214. If the test conditions are not satisfied, the "0" bit output signal from "OR" circuit 256 is connected to a "1" bit signal by inverter circuit 258 and will be gated by a "1" bit signal on lead 210 to provide a "1" bit signal on reject lead 216 which, being indicative that the input specimen is a number of set D, is applied to "D" indicator device 228.

Lead 214 is connected to "AND" circuits 260 and 262 of test means 204. Test means 204 performs an inclusive test of all set D specimens capable of passing test means 200 and 202. An "AND" circuit 264 is connected to lead 79 and to leads 77 and 78 through inverter circuits 266 and 268, respectively. An "AND" circuit 270 is connected to leads 72, 77, 78, 79, and 80. The outputs of "AND" circuits 264 and 270 are connected to "OR" circuit 272 and if either of the test conditions are satisfied, a "1" bit signal will be produced at the output of "OR" circuit 272 and be gated through "AND" circuit 260 by a "1" bit signal on lead 214 to provide a "1" bit pass signal on lead 218. If the test conditions are not satisfied, a "0" bit is produced by "OR" circuit 272 which is converted to a "1" bit signal by inverter circuit 274, gated through "AND" circuit 262 by a "1" bit signal on lead 214 to provide a "1" bit reject signal on lead 220 which, being indicative that the input specimen is not a member of set D, is applied to "not D" indicator device 226.

Lead 218 is connected to "AND" circuits 276 and 278 of test means 206. Test means 206 performs an inclusive test for members of specimen sets A, B, and C capable of passing test means 200, 202, and 204. An "AND" circuit 280 is connected to leads 71, 73, 74, and 76 and to lead 75 through inverter circuit 282. If the test is satisfied, a "1" bit signal is produced by "AND" circuit 280 which is gated by a "1" bit signal on lead 218 by "AND" gate 276 to provide a "1" bit pass signal on lead 222. If the test is not satisfied, the "0" bit output from "AND" circuit 280 is converted to a "1" bit signal by inverter circuit which is gated through "AND" circuit 278 by a "1" bit signal on lead 218 to provide a "1" bit reject signal on lead 224. A "1" bit signal on pass lead 222 is indicative that the input specimen is not a member of set D and is applied to "not D" indicator device 226 whereas a "1" bit signal on reject lead 224 is indicative that the input specimen is a member of set D and is applied to "D" indicator device 228.

Thus, it is seen that a test for the input specimen as a member of a new specimen set D may be added to the existing specimen identification system of FIG. 1. The tests designed to handle specimen sets A, B, and C need not be redesigned when specimen set D is added which means that in actual practice the system structure need not undergo extensive modification in order to add a new specimen group as desired. In like manner further channels for identifying additional specimen sets may be added. For example, a fifth channel for a further specimen set E and a sixth channel for a further specimen set F may be added without requiring a redesign of the tests within the previous existing test channels. As each additional test channel is added, the decision of that channel is preferred over a conflicting identification of a previous channel, thus, if a fifth channel for set E specimens is added and indicates that the input specimen is a member of set E, such takes precedence over a simultaneous indication by the fourth channel that the specimen is a member of set D.

What has been described is a specimen identification system for determining the identity of an unknown input specimen. The invention described has utility in a wide variety of specimen environments. For purposes of explanation the specimens set forth in the embodiment were in the form of digital signals, however, the principles set forth are not limited to any one particular signal environment or any particular class of specimen sets. Also, for purposes of simplicity, the explanation of the system operation was presented with three specimen sets A, B, and C, with a fourth specimen set D later added. This is not to be construed as a limitation on the handling capabilities of any system embodied under the principles of the present invention. The principles are applicable to a system for handling any number of specimen sets.

It is also to be understood that the specific inclusive tests included in each test means of FIGS. 2, 3, 4, and 6, and the specific circuits shown therein for carrying out the tests are presented for illustration only. The tests and circuits shown and described relate only to the specimens of specimen sets A, B, C, and D which were established only for purposes of explanation. In actual practice the inclusive tests and the circuits therefor will be determined by the actual specimens to be handled. However, as previously stated, the principles of the invention set forth herein may be applied to any practical specimen identification problem by one skilled in the art, and a suitable array of inclusive test and circuits therefore may be readily devised to operate with such specimens.

It will be appreciated that the circuits shown in FIGS. 2, 3, 4, and 6 are of simple construction, and carry out the specific test for which they were designed. To provide a more versatile over-all system it is suggested that the tests could be of the adaptive type, that is, the circuits, when presented to the specimens of the sets to be handled, will self-adapt to form the required tests. Self-adapting specimen recognition devices are known in the art, and no example will be given herein, however, it is suggested that a more sophisticated embodiment of the present invention is possible if self-adaptive test structures are incorporated rather than having to predesign each of the circuits of the inclusive test means for fixed sets of specimens.

While the invention has been particularly shown and described with reference to a preferred embodiment thereof, it will be understood by those skilled in the art that various changes in form and details may be made therein without departing from the spirit and scope of the invention.

What is claimed is:

1. A recognition system for identifying input specimens as members of given specimen classes comprising:
   - an input means responsive to an input specimen selected from said given specimen classes for generating signals characteristic thereof,
   - a plurality of test channels connected to said input means, each of said test channels being associated with a separate specimen class,
   - each of said test channels including a plurality of test means connected directly to said input means for performing separate specific tests on said characteristic signals and for producing a first output signal when said test is satisfied and a second output signal when said test is failed,
   - a separate indiçator device connected to each test channel and responsive to the resultant output signals of each test means therein for indicating the particular specimen class of said input specimen,
   - and gating means interconnecting the test means in each test channel such that said first and second output signals from each test means must be gated by a first output signal from the preceding test means in each test channel.

2. A recognition system according to claim 1 wherein given ones of said test means in each one of said test channels test said signals characteristic of said input specimen to determine if said input specimen is a member of the specimen class associated with said test channel and wherein other given ones of said test means test said characteristic signals to determine if said input specimen is a member of the specimen classes other than the specimen class associated with said test channel.

3. A recognition system according to claim 2 wherein a first test means of said plurality of test means in each one of said test channels includes a test designed to be satisfied by all of the members of the specimen class associated with each said given test channel,
   - a second test means of said plurality of test means in each of said test channels includes a test designed to be satisfied by all of the members of the specimen classes associated with the other of said plurality of test channels which are capable of satisfying the test included in said first test means in said given test channel,
   - and wherein odd numbered ones of the remainder of said plurality of test means in each one of said test channels include tests designed to be satisfied by the members of said specimen class associated with said given test channel which are capable of also satisfying each preceding test in said given test channel,
   - and wherein even numbered ones of the remainder of said plurality of test means in each one of said test channels include tests designed to be satisfied by the members of the specimen classes associated with the other of said test channels which are capable of also satisfying each preceding test in said given test channel.

4. A recognition system according to claim 3 wherein additional test channels, each associated with a separate additional specimen class, may be additionally connected to said input means, and wherein said input means is responsive to an input specimen selected from said given specimen classes and said additional specimen classes, each of said additional test channels including a plurality of test means and an indicator device for indicating whether said input specimen is a member of said associated specimen class.

5. A recognition system for identifying input specimens as members of given specimen classes comprising:

a plurality of test channels, each of said test channels being associated with a separate specimen class, each of said test channels including a plurality of separate test means having input terminals and first and second output leads, gating means connecting said first output lead of each test means in each test channel to the first and second output leads of each successive test means in said test channel, a separate indicator device associated with each test channel and connected to one of the output leads of each of the test means therein, and an input means responsive to an input specimen for generating signals characteristic thereof, said input means being connected to said input terminals of each of said test means in each of said test channels for applying at least one of said signals characteristic of said input specimen to each of said test means for actuating said indicator device associated with said test channel representative of the specimen class of said input specimen.

6. A recognition system according to claim 5 wherein each of said test means is responsive to at least one of said characteristic signals from said input means for testing said at least one signal for selected qualities and for providing an output signal on said first output lead thereof when said qualities are present and for providing an output signal on said second output lead thereof when said qualities are absent.

7. A recognition system for identifying input specimens according to claim 6 wherein an output signal on said first output lead and an output signal on said second output lead of each test means must be gated by an output signal on said first output lead of the preceding test means applied via said gating means.

8. A recognition system according to claim 6 wherein said input means generates an $n$ bit binary signal having "1" bit manifestations and "0" bit manifestations in said $n$ bit positions which are characteristic of said input specimen, and wherein each of said test means in each of said test channels tests for the presence of said "1" bit and said "0" bit manifestations in at least one of said bit positions.

9. A recognition system for identifying input specimens as members of given specimen classes comprising:

a plurality of test channels, each of said test channels being associated with a separate specimen class, each of said test channels including a plurality of separate inclusive test means having input terminals and first and second output leads, successive inclusive test means in each test channel being connected to the first output lead of the preceding inclusive test means, a separate first indicator device associated with each test channel and connected to the first output leads of given ones of said inclusive test means and to the second output leads of other given ones of said inclusive test means in each test channel, a separate second indicator device associated with each test channel and connected to the second output leads of given ones of said inclusive test means and to the first output leads of other given ones of said inclusive test means in each test channel, and an input means responsive to an input specimen for generating signals characteristic thereof, said input means being connected to said input terminals of said inclusive test means in each of said test channels for applying at least one of said signals characteristic of said input specimen to said inclusive test means for actuating said first indicator device associated with said test channel representative of the specimen class of said input specimen and said second indicator devices associated with the other test channels representative of the specimen classes not associated with said input specimen.

10. A recognition system for identifying input specimens as members of given specimen classes comprising:

a plurality of test channels, each of said test channels being associated with a separate specimen class, each of said test channels including a plurality of inclusive test means responsive to an input specimen selected from said given specimen classes, given ones of said inclusive test means in each test channel including inclusive tests for specimens of the specimen class associated with said test channel and other ones of said inclusive test means in each test channel including inclusive tests for specimens of the specimen classes associated with the other ones of said plurality of test channels, gating means interconnected between each of said inclusive test means in each test channel such that said given ones of said inclusive test means are connected to said other ones of said inclusive test means in each test channel in serial fashion, and a plurality of indicator means, each one associated with and connected to the inclusive test means in a separate one of said test channels for indicating whether said input specimen is a member of said specimen class associated with each of said test channels.

11. A recognition system according to claim 10 wherein said inclusive test means in each test channel includes a first output lead and a second output lead, each of said inclusive test means providing an output signal on said first output lead when said input specimen satisfies said inclusive test therein and an output signal on said second output lead when said input specimen does not satisfy said inclusive test therein.

12. A recognition system according to claim 11 wherein said gating means interconnected between each of said inclusive test means in each test channel includes a first gating circuit connected between said first output lead of each inclusive test means and the first output lead of the preceding inclusive test means and between said second output lead of each inclusive test means and the first output lead of the preceding inclusive test means, said output signals on said first and second output leads of each inclusive test means being dependent on the presence of an output signal on the first output lead of the preceding inclusive test means.

13. A recognition system according to claim 12 wherein additional test channels, each associated with a separate additional specimen class, may be additionally included, each having a plurality of inclusive test means responsive to said input specimen selected from said given specimen classes and said additional specimen classes, each of said additional test channels further including an indicator device for indicating whether said input specimen is a member of said specimen class associated with each of said additional test channels.

References Cited by the Examiner

UNITED STATES PATENTS

| | | | |
|---|---|---|---|
| 3,074,050 | 1/1963 | Shultz | 340—146.3 |
| 3,152,318 | 10/1964 | Swift | 340—146.3 |
| 3,167,745 | 1/1965 | Bryan et al. | 340—146.3 |

MAYNARD R. WILBUR, *Primary Examiner.*

MALCOLM A. MORRISON, *Examiner.*

J. E. SMITH, *Assistant Examiner.*